United States Patent
Richey

[15] 3,662,840
[45] May 16, 1972

[54] TWO-WAY PLOW WITH HYDRAULIC TRIP AND RESET

[72] Inventor: Clarence B. Richey, Fresno, Calif.
[73] Assignee: Massey-Ferguson, Inc., Des Moines, Iowa
[22] Filed: Jan. 21, 1969
[21] Appl. No.: 792,391

[52] U.S. Cl. .................... 172/224, 172/265, 172/573
[51] Int. Cl. ........................................... A01b 3/34
[58] Field of Search ............... 172/204, 224, 264, 265, 572, 172/573, 605, 710

[56] References Cited

UNITED STATES PATENTS

| | | | |
|---|---|---|---|
| 3,517,748 | 6/1970 | Fischer | 172/265 X |
| 2,913,059 | 11/1959 | Toland et al. | 172/224 |
| 3,321,031 | 5/1967 | Evans | 172/605 |
| 3,420,315 | 1/1969 | Roth | 172/265 |

FOREIGN PATENTS OR APPLICATIONS

| | | | |
|---|---|---|---|
| 201,908 | 7/1958 | Germany | 172/224 |
| 79,277 | 10/1962 | France | 172/224 |
| 148,617 | 3/1961 | U.S.S.R. | 172/572 |

Primary Examiner—Clyde I. Coughenour
Attorney—Gerhardt, Greenlee & Farris

[57] ABSTRACT

A two-way semi-mounted plow comprises a pull tube having a rear steerable tail wheel and which journals a diagonal beam mounting two rows of opposed left and right-hand plow bottoms. Power means is provided for rotating the beam 180° to alternately engage each row of bottoms with the ground. Each bottom is mounted on the end of a support arm which is pivoted to the beam. A hydraulic ram interconnects each pair of opposed support arms to extend the bottoms until the other ends of the support arms abut the beam. Upon encountering an obstacle, a bottom will deflect, compressing the ram which reacts through the opposed support arm on the frame. Thus only one ram is required for each pair of opposed bottoms.

7 Claims, 4 Drawing Figures

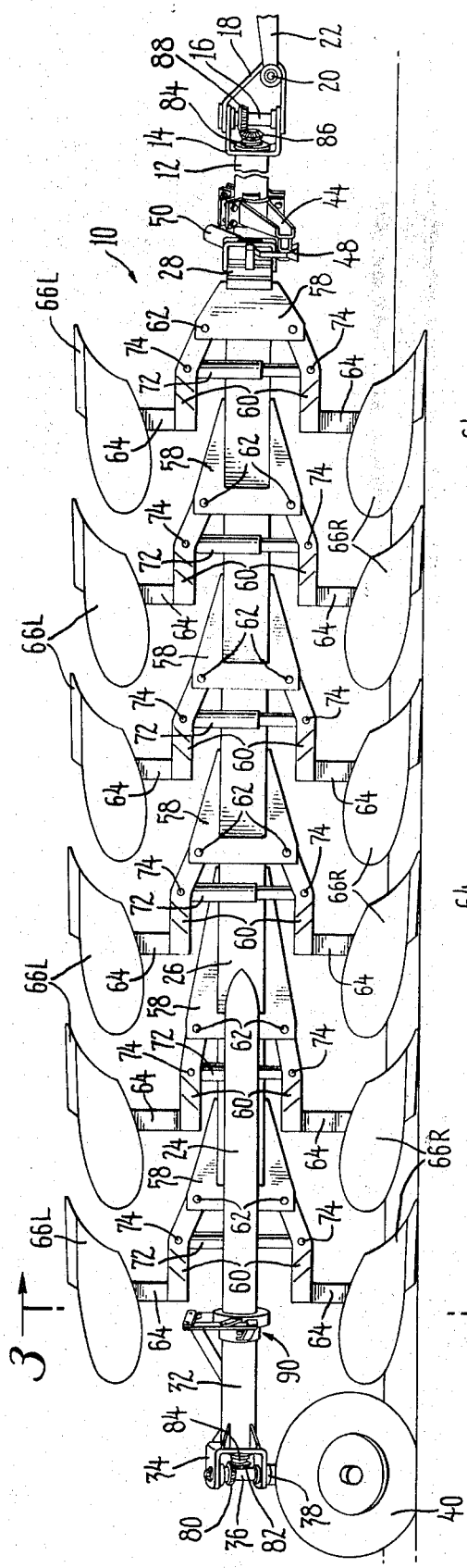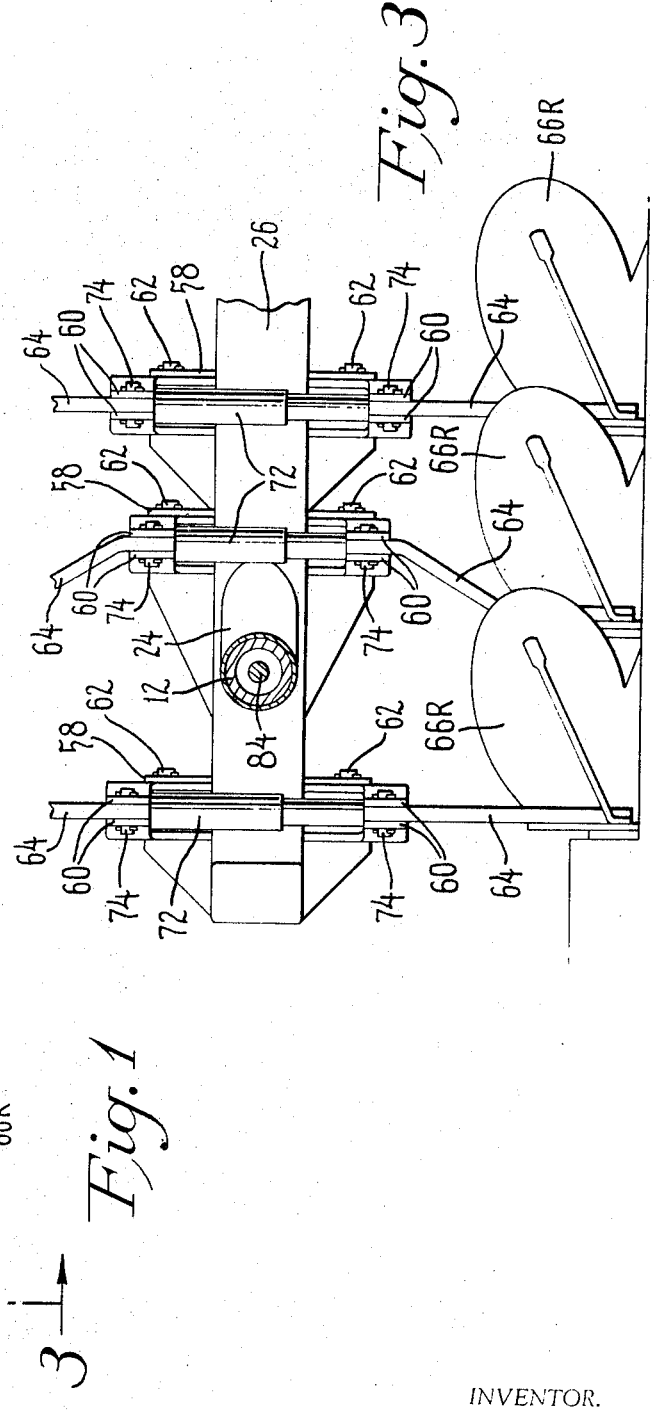

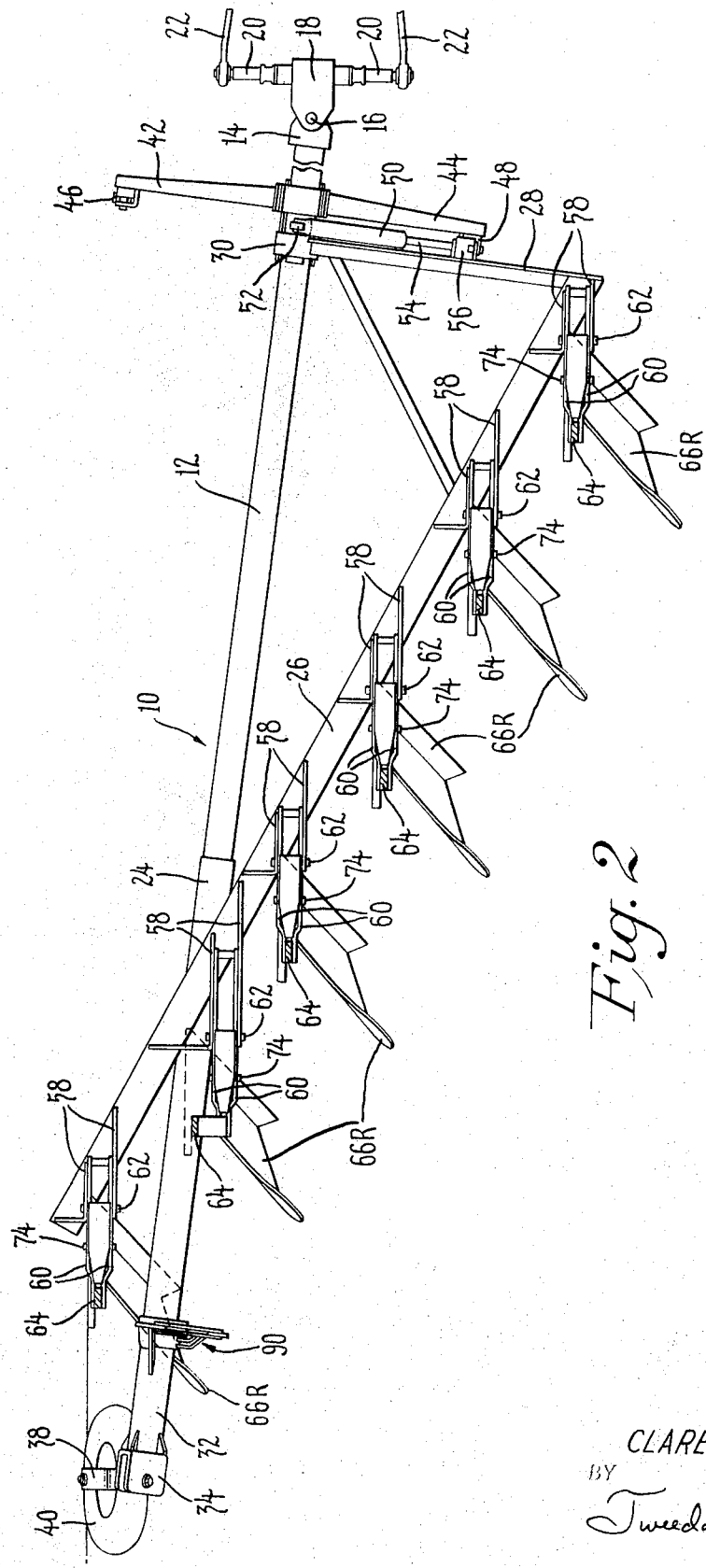

INVENTOR.
CLARENCE B. RICHEY
BY
Tweedale & Gerhardt
ATTORNEYS.

TWO-WAY PLOW WITH HYDRAULIC TRIP AND RESET

This invention relates generally to earthworking implements and more particularly to a hydraulic trip and reset mechanism for a tractor-drawn two-way plow.

To met the growing demand for a two-way plowing implement, semi-mounted plows have been developed which have rows of opposed left and right-hand plow bottoms which may alternately be moved into ground engaging position. As with a conventional one-way plow, use of such an implement in extremely rocky soil would require the provision of a trip mechanism to permit movement of the individual plow bottoms out of ground engaging position upon encountering an obstacle, such as a rock, in the ground to prevent damage, in the nature of deformation or fracture, to the plow bottom.

Conventional one-way plows utilize a separate trip mechanism for each individual bottom. A two-way plow provided with a similar arrangement would utilize only half the trip mechanisms at any one time. This arrangement would thus be uneconomical. Also, the spaced limitations caused by the close proximity of the two rows of opposed plow bottoms would present problems in design, manufacture and service.

It is therefore an object of this invention to provide a two-way plow with a single trip mechanism for each pair of opposed bottoms, thereby halving the number of required trip mechanisms by utilizing each trip mechanism at all times.

In accordance with this invention, a plow or other earthworking implement is provided with a frame which mounts a plurality of pairs of opposed earthworking tools or plow bottoms for movement by operating means between alternate operative ground engaging and elevated positions, and trip means for enabling movement of each tool out of operative position, including means enabling swinging movement of each tool into and out of operative position, abutment means on each tool and on the frame engageable to limit the swinging movement into operative position, and biasing means extending between each pair of opposed tools and biasing the abutment means into engagement, whereby swinging movement of a tool out of operative position is resisted by the biasing means reacting on the frame through the opposed tool and abutment means.

These and additional objects and features of this invention will become more readily apparent upon reference to the following detailed description of a preferred embodiment, as shown in the accompanying drawings, wherein:

FIG. 1 is a side elevation of a two-way plow having trip mechanisms according to this invention;

FIG. 2 is a plan view of the plow shown in FIG. 1;

FIG. 3 is an enlarged sectional view taken generally along lines 3—3 of FIG. 1.

Figure 4:
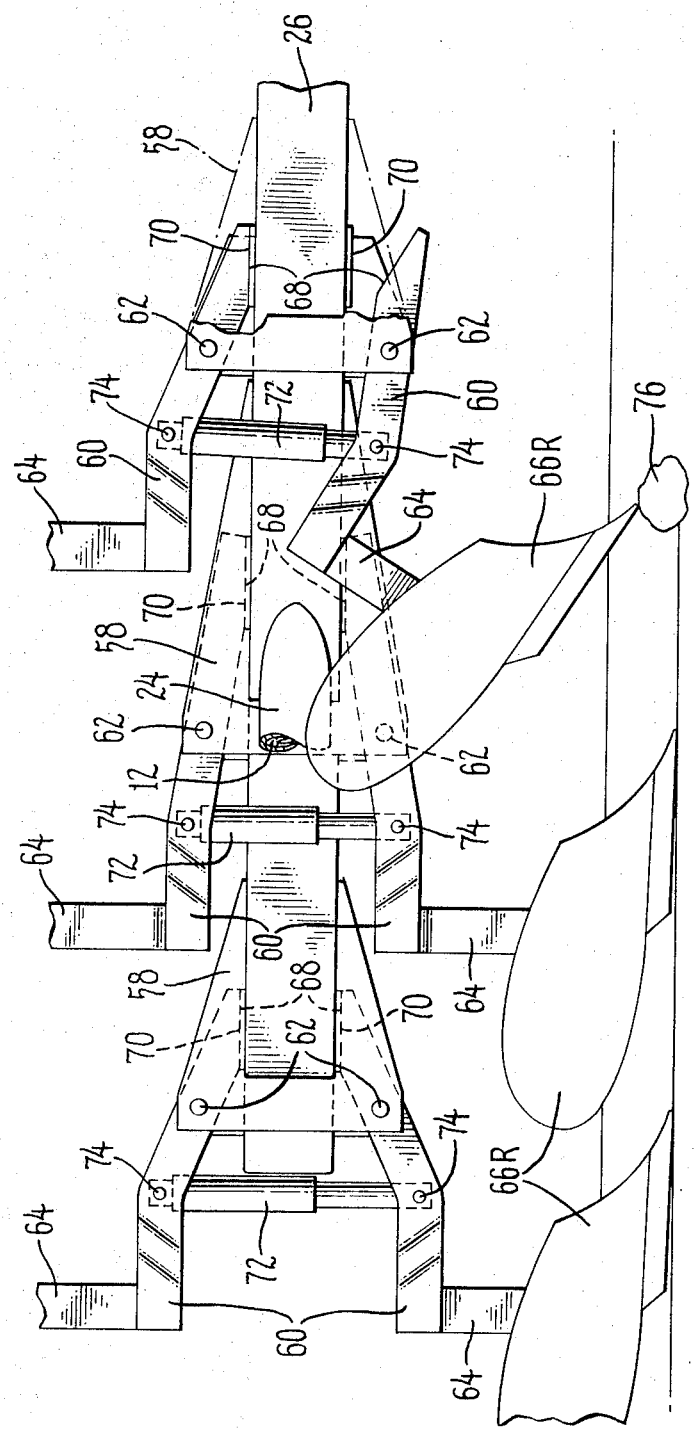
FIG. 4 is an enlarged detail view of a portion of the plow, illustrating the operation of the trip mechanisms.

Referring now to FIGS. 1 and 2 of the drawings, a semimounted turnover plowing implement, generally designated 10, includes a draft frame member or pull tube 12 which is mounted on a C-shaped bracket 14 that is connected by a pivot rod 16 to a draft bracket 18. The bracket 18 includes a pair of oppositely extending cross bars 20 which are conventionally mounted to the lower draft links 22 of a tractor (not shown).

The pull tube 12 extends rearwardly and journals a sleeve 24 thereon. Sleeve 24 rigidly mounts a diagonal frame member or beam 26 which is connected at its forward end to the outer end of a frame member 28. A collar 30, rotatably supported on the forward portion of pull tube 12 mounts the inner end of frame member 28. Rearwardly of sleeve 24, pull tube 12 journals another sleeve 32 that mounts a C-shaped bracket 34. A rod 36 is journalled in bracket 34 and mounts an angled bracket 38 that carries a steerable rear furrow wheel 40.

Forwardly of collar 30, pull tube 12 rigidly mounts a pair of opposed transverse arms 42 and 44 which mount respective latch members 46 and 48 at their extremities. A hydraulic ram 50 is pivoted at 52 to pull tube 12 and has its output arm 54 attached to a mounting member 56 on frame member 28. Ram 50 is supplied with pressure fluid by conventional means from the tractor hydraulic system, not shown.

Beam 26 mounts a plurality of spaced pairs of brackets 58 which pivotally mount pairs of opposed support arms 60 at 62. At its outward end, each arm 60 supports a mounting member 64 which mounts a conventional plow bottom of either the left-hand type 66L or of the right-hand type 66R.

Referring now to FIG. 4, the inner end of each arm 60 includes an angled abutment surface 68 which is engageable with an abutment plate 70 mounted on pull tube 12 to limit pivotal movement of each of the bottoms outwardly of the frame into an operative position, as shown in FIGS. 1 and 3. Biasing means in the form of a hydraulic ram 72 is pivoted at 74 to each of the opposed pairs of support arms 60L and 60R at a point intermediate mounting member 64 and pivot 62. The rams 72 are each interconnected with a source of constant hydraulic pressure, such as a accumulator or the tractor hydraulic system, not shown, in a conventional manner. Pressurization of the rams 72 forces the opposed bottoms 66L and 66R apart to engage the abutments 68 and 70.

When the low 10 is in use, rams 72 bias the ground engaging row of plow bottoms 66R into engagement with the earth, as shown in FIGS. 1 and 3. When an obstruction is encountered, such as rock 76 shown in FIG. 4, with a force sufficient to overcome the force exerted by ram 72, the obstructed plow bottom 66R is forced upwardly, collapsing the ram which transmits this force, or reacts, on beam 26, through support arm 60L and abutments 68 and 70 of the opposed bottom 66L. With this arrangement it is readily apparent that only one ram 72 is required for each pair of opposed plow bottoms. This is accomplished by permitting the ram to react on the frame through the opposed bottom support structure rather than directly on the frame, as is conventional in one-way plows.

Operation of the ram 50 to reverse the positions of the plow bottoms, so that bottoms 66L engage the earth and bottoms 66R are elevated, is fully disclosed in copending application Ser. No. 524,191, and now U.S. Pat. No. 3,524,509 entitled, "Semi-mounted Earthworking Implement," filed Feb. 1, 1966. Briefly, ram 50 is pressurized to extend and disengage latch member 48 from mounting member 56. Further pressurization causes sleeve 24 and collar 30 to pivot on pull tube 12 and move frame member 28 and beam 26 and the plow bottoms through a 180° arc. This movement is limited by engagement of latch member 46 with mounting member 56 which locates bottoms 66L in earth engaging position, and bottoms 66R elevated. Thereafter, operation of the trip mechanisms is similar to that just described, with upward movement of a bottom 66L being resisted by a ram 72 reacting, through an arm 60R and abutments 68 and 70 of opposed bottom 66R, on beam 26.

The plow 10 further includes a steerable and automatically tiltable mechanism for the rear furrow wheel 40, as fully disclosed in the aforementioned copending application. Briefly, this arrangement comprises a bevel gear 80 which meshes with a bevel gear 82 mounted on a steering rod 84 that extends concentrically through the pull tube 12 to termination with a bevel gear 86. Gear 86 meshes with another bevel gear 88 mounted on the wheel pivot rod 36. The wheel 40 is automatically tilted to run against the side of the outermost furrow by a mechanism 90 which is operable to rotate sleeve 32 during movement of the beam 26. This mechanism is more fully set forth in the aforementioned copending application.

While only a preferred embodiment of this invention is shown and described, obvious modifications are contemplated within the scope of the appended claims.

I claim:

1. In combination with a multi-bottom turnover plow having a frame which mounts a plurality of pairs of opposed bottoms for concurrent movement between operative ground engaging and elevated positions, improved trip means for enabling temporary independent movement of each bottom out of operative position upon encountering an obstacle, comprising: mounting means mounting each bottom on the frame for independent movement into and out of operative position, abutment means on each mounting means an on the frame engageable to limit such movement of the bottoms to operative position, and biasing means extending between the opposed mounting means for biasing the abutment means into engagement to position the opposed bottoms in operative position, whereby the said movement of a bottom out of operative position upon encountering an obstacle is resisted by biasing means which reacts through the opposed bottom and its abutment means on the frame, the mounting means each include a support member mounting a bottom at one end and means pivoting the support member to the frame at a spaced pivot point, the abutment means include an abutment surface on the support member at a point spaced from the pivot point and a corresponding abutment surface on the frame, and the support member pivot point is located between the plow bottom and the support member abutment surface.

2. In combination with a multi-bottom turnover plow having a frame which mounts a plurality of pairs of opposed bottoms for concurrent movement between operative ground engaging and elevated positions, improved trip means for enabling temporary independent movement of each bottom out of operative position upon encountering an obstacle, comprising: mounting means mounting each bottom on the frame for movement into and out of operative position abutment means on the mounting means and on the frame engageable to limit such movement of the bottoms to operative position, and biasing means extending between the opposed mounting means for biasing the abutment means into engagement to position the opposed bottoms in operative position, whereby the said movement of a bottom out of operative position upon encountering an obstacle is resisted by the biasing means which reacts through the opposed bottom and its abutment means on the frame, and the biasing means include a constant force device interconnecting each pair of opposed mounting means and exerting a constant force thereon to engage the abutment means and resist said swinging movement of the bottoms out of operative position.

3. The combination of claim 2, wherein; the constant force device is a hydraulic cylinder having a constant pressure supply for extending the cylinder to engage the abutments.

4. In combination with a multi-bottom turnover plow having a frame which mounts a plurality of pairs of opposed bottoms for concurrent movement between operative ground engaging and elevated positions, improved trip means for enabling temporary independent movement of each bottom out of operative position upon encountering an obstacle, comprising: mounting means mounting each bottom on the frame for independent movement into and out of operative position, abutment means on each mounting means and on the frame engageable to limit such movement of the bottoms to operative position, and biasing means extending between the opposed mounting means for biasing the abutment means into engagement to position the opposed bottoms in operative position, whereby the said movement of a bottom out of operative position upon encountering an obstacle is resisted by the biasing means which reacts through the opposed bottom and its abutment means on the frame, the mounting means each include a support member mounting a bottom at one end and means pivoting the support member to the frame at a spaced pivot point, the abutment means include an abutment surface on the support member at a point spaced from the pivot point and a corresponding abutment surface on the frame, and wherein said biasing means include a constant force device interconnecting each pair of opposed mounting means and exerting a constant force thereon to engage the abutment means and resist said swinging movement of the bottoms out of operative position.

5. The combination of claim 4, wherein: the constant force device is a hydraulic cylinder having a constant pressure supply for extending the cylinder to engage the abutments.

6. A multi-bottom turnover plow, comprising in combination: a frame, two rows of plow bottoms arranged 180° apart about the frame to form opposed pairs of bottoms, a plurality of supports each mounting a bottom at one end thereof and pivoted to the frame at a spaced point to enable individual swinging movement of the bottoms into and out of operative position, means for rotating the frame about a substantially horizontal axis to alternately position each row of bottoms in ground engaging and elevated positions, abutment means on each support and on the frame to limit swinging movement of each bottom to operative position, and biasing means extending between the supports of each pair of opposed bottoms to bias the abutment means into engagement and position the bottoms in operative position, whereby swinging movement of a bottom out of operative position is resisted by the biasing means reacting through the opposed support and abutment means on the frame, and wherein the biasing means include a constant force device interconnecting each pair of opposed mounting means and exerting a constant force thereon to engage the abutment means and resist said swinging movement of the bottoms out of operative position.

7. The combination of claim 6, wherein: the constant force device is a hydraulic cylinder having a constant pressure supply for extending the cylinder to engage the abutments.

* * * * *